Patented Oct. 30, 1945

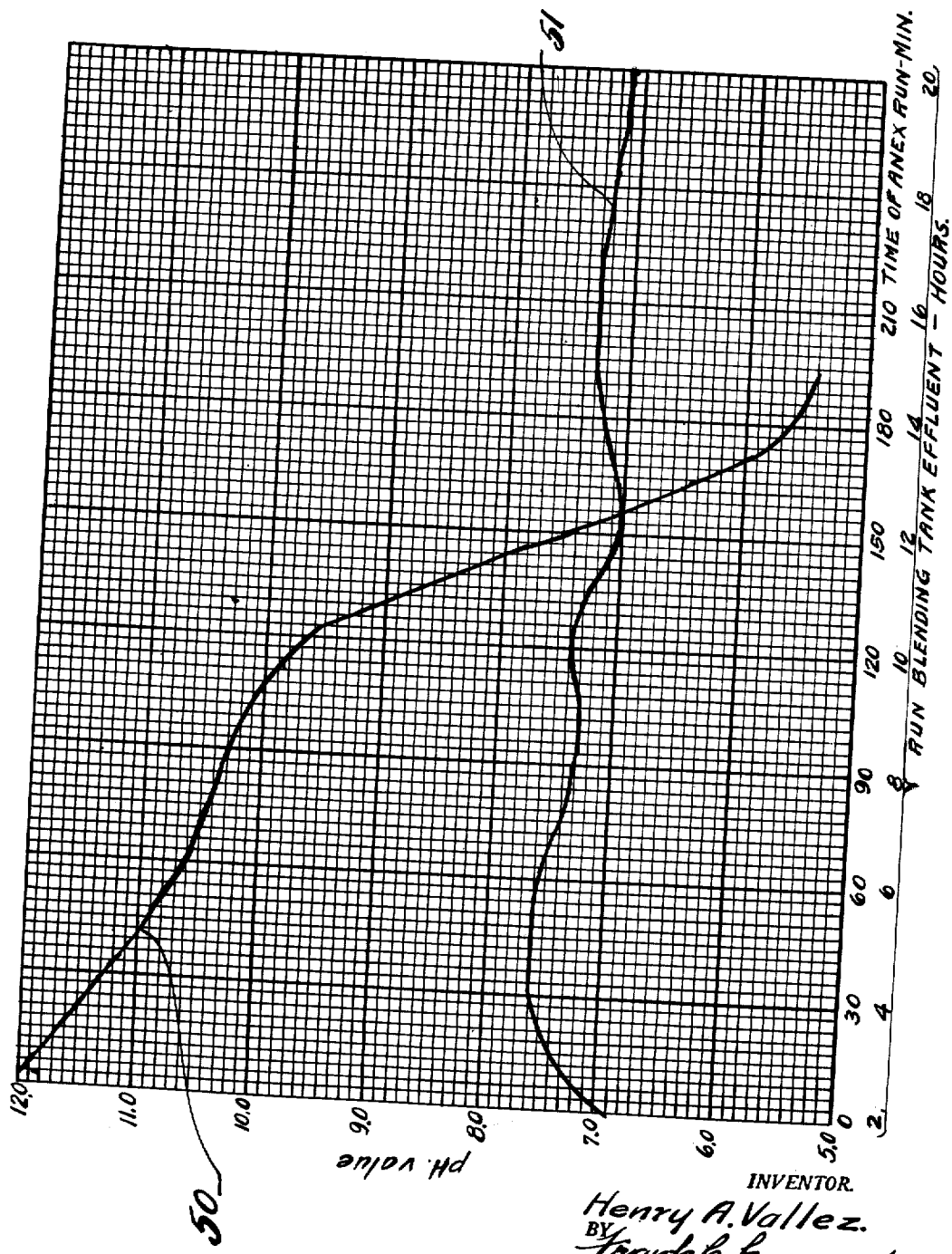

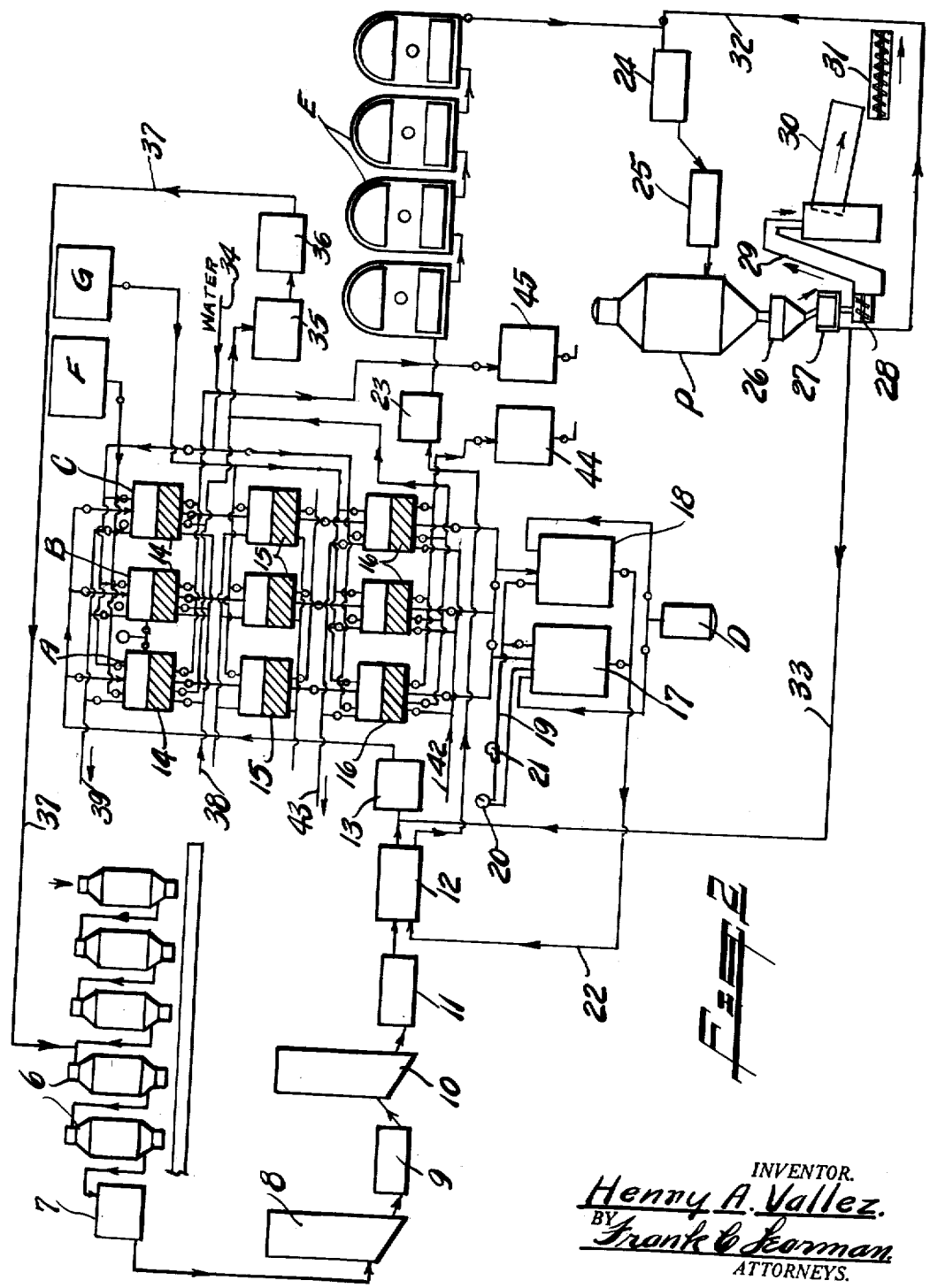

2,388,195

UNITED STATES PATENT OFFICE 2,388,195

PROCESS FOR PURIFICATION OF SUGAR JUICES AND THE LIKE

Henry A. Vallez, Bay City, Mich., assignor, by mesne assignments, to Infilco Incorporated, Chicago, Ill., a corporation of Delaware Application October 19, 1942, Serial No. 462,640

7 Claims. (Cl. 127—46)

This invention relates to pure granulated sugar and pure liquid sugar. It also relates to the improved method of and apparatus for the manufacture of liquid and granulated sugar, whereby the juice or solution of sugar may be processed to eliminate substantially all of its color, mineral salts, and other organic and inorganic impurities.

In my patent application, Serial No. 396,083, filed May 31, 1941, I have disclosed a method for the purification of sugar solutions and juices by means of a hydrogen zeolite material and acid adsorption resin. In the method therein described the pH of the effluent from the bed of acid adsorption resin constantly changed during a run in accordance with the increasing degree of exhaustion of the bed. The resulting sugar solution was therefore inclined to vary in quality from one portion to another. The sweet water obtained at the beginning and end of a run contains appreciable amounts of sugar which must be recovered in an economical manner.

In order to produce a blended and uniform solution, I have found it desirable to use a multiplicity of exchange units connected by suitable piping and valves, so that an over-lapping or staggered operation of the units may be secured. In order to further secure uniformity as to pH of the purified sugar solution, I have found it desirable to run the purified solution into blending tanks prior to passage to the evaporators.

Beet juice, and to some extent cane juice, has a bitter taste which is difficult to remove by conventional methods. An object of this invention therefore, is to produce a highly purified liquid or granulated sugar or syrup free from bitter or other objectionable tastes.

Another object of the invention is to provide a process of purifying beet and cane sugar solutions in which more uniform results are obtained as to purity and pH.

A further object of the invention is to provide a purification method which is continuous, and in which regenerated exchanger units can be cut in, as one exhausted unit is cut out, thus not interrupting the flow of solution through the plant.

A further object of the invention is to simplify the method of refining and purifying sugar by eliminating a number of treatment steps which are necessary in the present conventional practice.

A further object of the invention is to provide a method in which a cation exchange bed and an anion exchange bed are arranged in series, hereinafter referred to as a unit, and several of these units comprise a battery, the battery being so arranged that when one unit has reached a predetermined degree of exhaustion, a second fresh unit may be cut in and the effluents from the units mixed, so that the high pH solution from the beginning or first part of a run from one unit, will be mixed and blended with the low pH juice from the latter part or end of another unit, thus controlling and maintaining the pH of the juice approximately uniform at all times.

A further object of the invention is to provide a method in which the sugar solution from the units operating in staggered or over-lapping relation, is run into blending tanks to mix and blend the solution and insure a uniform pH and purity in all portions of the solution.

A further object of the invention is to provide a method in which a low pH in effluent sugar solution is avoided by proper blending, thus preventing inversion of the sucrose in the subsequent step of evaporation.

A further object of the invention is to work the cation and anion beds within wider limits of effluent pH, thus increasing the length of run and decreasing the frequency of regeneration without appreciable loss of juice or the regenerating agents as well as the amount of sweet water produced.

A further object of the invention is to provide a process of purifying sugar solutions in which the sweet water produced at the beginning and end of a run is utilized for extracting more sugar in the diffusion battery in the case of beet sugar manufacture, or as maceration water in the series of roller mills, in the case of cane sugar manufacture.

A still further object of the invention is to provide an apparatus for carrying out the improved method; also to improve liquid and granulated sugar and juices; their method of manufacture; and the apparatus for carrying out the method in other respects hereinafter specified and claimed.

Reference is to be had to the accompanying drawings forming a part of this specification, in which:

Fig. 1 is a graphical illustration showing a typical pH curve of the resin bed effluent which I previously obtained, together with another typical curve showing the pH of the effluent after treatment in the blending tanks.

Fig. 2 illustrates a typical application of the present invention to the manufacture of sugar, liquid sugar and syrup.

Fig. 2 of the drawings diagrammatically represents a typical plant for the manufacture of beet sugar by my invention, and includes a diffusion battery 6 and a conventional liming tank 7 where the diffusion juice is treated with lime for the purpose of increasing the pH and precipitating colloids and organic impurities. In the case of cane sugar manufacture, the diffusion batteries would be replaced by a plurality of roller mills. From the liming tank 7, the juice passes through a filter 8, to the first carbonator 9, the filter 10, and thence to the second carbonator 11 where it is treated in the usual manner. This initial treatment and clarification of the raw juice takes place at a somewhat elevated temperature of about 90° to 95° C., and the thin juice is then cooled to a temperature of about 50° C. by passing it through a heat exchanger 12, thence the juice is further cooled to a temperature of about 20° C. in a suitable cooler 13. At this stage in the process, ordinary beet juice will have an inorganic or salt content of from about 0.3% to about 0.5%, and an organic non-sugar content equivalent to about 2.0% to 3.0% of the sugar content, consequently it will be obvious that the juice is relatively impure. Other methods of predefecating or clarification of the juice may be used.

While in the present illustration, I have shown the battery composed of three units, it will be clearly understood that any desired number may be employed, depending on conditions and capacity desired.

After the juice has been cooled, it is treated in one of the exchanger units A, B. or C. each unit comprising a cation exchange bed indicated at 14 which contains a quantity of material having hydrogen exchange properties, such as carbonaceous zeolite, which acts to convert the different salts in the sugar juices to the corresponding free acids, thereby initially eliminating practically all of the melassigenic inorganic salts from the juice.

From the exchanger bed 14. the juice is preferably, but not necessarily, passed through an activated carbon bed 15, where the entrained colored bodies are removed, and thence the acidic raw juice flows to an anion exchange bed 16, which bed removes acids from the solution by adsorption or exchange.

These exchanger units A, B, and C are identical, and the juice flow through each of them is exactly the same, the completeness of removal of the inorganic materials being dependent upon the effectiveness of the cation and anion exchange materials employed. These beds must be periodically regenerated after they have treated certain predetermined volumes of sugar juice.

The effluent from the cation exchange bed 14 initially should have a pH of about 2 in the case of beet juice, the bed being regenerated when the pH rises to about 3. The juice from the hydrogen exchange treatment is subsequently subjected to contact with the carbon bed 15, and then with an acid removal or anion exchange material in bed 16. The effluent from the bed of acid removal material 16 initially should have a pH of about 11 or 12, the pH gradually lowering as the run progresses and the impurities build up in the beds (see curve 50, Fig. 1 of the drawings), and when the pH drops to about 5, the bed requires regeneration.

These units form a part of the general process for the purification of the sugar solution and inasmuch as the pH of the juice drops from 11 or 12 at the beginning of the run, to about 5 at the end of the run, it will be obvious that the pH of successive portions of the juice from the anion bed will not be constant and uniform, but will range from 11 or 12 to about 5 as shown graphically in Fig. 1 of the drawings.

When the process is in operation, the juice from the cooler 13 flows to unit A, and when this unit is about one-half spent, I cut in the unit B, so that low pH juice from the last one-half of the run from the unit A will mix with the high pH juice from the first one-half of the run from the unit B, then when the unit A is spent, I cut in the new or regenerated unit C, and the high pH juice from the first part of this run will mix with the low pH juice from the last half of the run from the unit B, thereby providing a juice of practically uniform pH.

The sulphates and chlorides in the raw juice in the form of salts are converted in the cation exchange bed to sulphuric acid and hydrochloric acid, and the carbonates and bicarbonates are converted to carbonic acid, part of which may escape from the process in the form of carbon dioxide. Aeration of the juice may be used to free it of carbon dioxide. In one case where beet juice is treated, I find that the cation and anion beds require regeneration at the end of approximately each 30,000 gallon run, and when the usual volume of juice has been treated, the exhausted beds are disconnected and regenerated, the raw juice being connected to a newly regenerated unit.

It is of prime importance to control the pH of the juice after treatment in the cation and anion exchange beds. Too low a pH in the juice will cause inversion of the sugar, and too high a pH may cause caramelization and the production of color. For this purpose I provide a plurality of mixing or blending tanks 17 and 18 respectively, each tank having sufficient capacity to hold the entire volume of juice treated by its associated exchange beds during each run, or smaller tanks may be provided to contain only the beginning and end of each run. These tanks receive through suitable conduits, controlled by suitable valves, the effluent from the anion exchange beds, thus making it possible to mix and blend the high pH juice from the beginning of the run of a unit with the low pH juice from the end of the run of the same unit, so that the entire volume of juice for each run will be equalized to the same pH. Also, the high pH juice from the start of a run through one unit can be blended with low pH juice from the end of the run through another unit, or both methods of blending can be jointly applied to the juice. The blended juice can then be treated, if necessary, with either sulphur dioxide or an alkali; if the pH is higher than required for maximum production and efficiency of the process, the juice is treated with sulphur dioxide from a tank D to reduce the pH to the required value, which normally is about 7.5. This may vary from time to time due to the condition and quality of the product being processed, and if it is found that the pH of the juice is too low, the juice is treated with an alkali to raise pH to the required value, one of the mixing tanks being disconnected and treated while the other is being filled. Curve 51 of Fig. 1 is typical of the pH of the juice from the blending tanks.

This general method of applying ionic exchangers is cyclic in nature, each cycle comprising an exhausting and a regenerating operation. When the units B and C are in operation, the unit A is being regenerated, and when the unit B is spent, it is disconnected and the regenerated unit A again connected, etc., so that a regenerated unit can be cut in as each succeeding unit is spent.

A pipe 19 serves to connect a conventional pH instrument 20 to the blending tanks, which is provided with a dial, as usual, to indicate the pH of the juice, a pump 21 being interposed in the line 20 to force the juice to the instrument.

After the juice in a blending tank has been treated, if necessary, to bring it to the desired pH, it should be heated prior to delivery to the evaporators E, and inasmuch as the raw juice from the carbonators has a temperature of about 90° C. and requires cooling before treatment in the exchange beds, I, therefore, circulate the effluent through the pipe line 22, from the blending tank through the heat exchanger 12, utilizing this cool effluent to cool the hot raw juice, and the hot raw juice to heat the cool effluent to about 60° C., thus effecting a material saving in fuel, etc. From the heat exchanger 12, the effluent desirably flows to a heater 23 for further temperature adjustment, and is then sent to a series of evaporators E where it is boiled down to desired concentration, thence the juice is sent to a mixing tank 24, a filter 25, and is then sent to a white sugar vacuum pan P where it is further concentrated and crystallized. The effluent syrup from the evaporators E may also be sold as liquid sugar or syrup.

From the vacuum pan P, the crystallized mixture is passed through a mixer 26 and into a centrifuge 27 where the sugar crystals are separated. This white sugar is then discharged into a conveyor 28 which conveys it to an elevator 29, and this elevator discharges into a dryer 30. From the dryer a conveyor 31 conveys the sugar to a packing room for packing or storage.

The mother liquor which is separated in the centrifuge 27 is of a very high purity, of the order of 98 or more. Because of this high purity and freedom from appreciable quantities of the molasses constituent customarily recovered from the centrifuges, the mother liquor may be recirculated through the line 32 back to the main process at the mixing tank 24, instead of being boiled down to a brown sugar or sent back to a prior stage for further purification as has heretofore been necessary. The high purity of the mother liquor permits the process to be bottled up in this manner for substantial periods without the introduction of appreciable quantities of impurities in the finished products, and it will be observed that the process requires one boiling only, eliminating the additional boiling pans found in the prior art. However, when the process has been bottled up for a sufficiently long period, an accumulation of molasses constituent will occur, making it necessary to remove some of the syrup from the process from time to time, but not continuously as in the prior art, and when finally withdrawn from the crystallization cycle, this residue can be re-routed through the pipe line 32 and again mixed with the raw juice for further treatment in the exchange beds.

Whereas by my improved process, I put juice into the evaporators with a purity of 98, it has been customary in the prior art, for the juice entering the evaporators to have a purity of about 90 in the case of beet juice, and about 80 in the case of cane juice, thus accounting for the large amount of molasses produced.

When the exchange beds of a battery require regeneration, the flow of juice to the respective exchange bed 14 is cut off, and the juice remaining in the beds of the battery is forced out by water from the water line 34, this juice flowing to the blending tank 17 or 18, as the case may be. When the displaced juice becomes diluted by the water to the extent of forming sweet water, it is diverted to tank 35 where it is treated with an alkali to bring it to the proper pH, thence to a heater 36 where it is brought to proper temperature, after which it flows through line 37 back to the diffusion battery 8 where it is used as a part of the battery supply water. It is not entered at the tail end of the battery, as is the usual supply water, but is introduced a few cells ahead at a point where the sugar content of the diffusion juice is slightly higher than the sugar content of the sweet water, so that it in no manner interferes with the proper efficient operation of the battery, but instead, aids in the extraction of sugar in subsequent cells. This sweet water has been found to represent, in one plant, approximately 500 pounds of sugar for each regeneration of one unit, and its reuse represents a substantial saving. If cane juice is purified, this sweet water will be used as maceration water between certain of the roller mills.

After a bed 14 has been sweetened off, it is regenerated by treatment with a solution of sulphuric acid from supply tank F. This restores the initial hydrogen exchange properties of the zeolite and effects the removal of impurities collected during the run. The bed is then backwashed through a water line 38 which is connected to the bed 14 and overflows through the pipe 39.

The carbon bed is regenerated by treatment with an alkali from a suitable supply tank G, and intake and overflow pipes 40 and 41, respectively, provide for backwashing, etc. The bed 16 is regenerated by treatment with an alkali in substantially the same manner as the bed 15. The beds 16 are also connected to the alkali supply tank G, and a soft water line 42 is connected to each bed and overflows through pipe 43 to drain, the regenerating solutions from the beds flowing to tanks 44 and 45, respectively as shown.

By-products of value may be recovered in the regeneration of the beds after they have treated the usual amount of sugar juice. The hydrogen carbonaceous zeolite is regenerated with about 2% solution of sulphuric acid, and this regenerating solution, after use, contains a large amount of potassium sulphate together with ammonium sulphate, amine compounds, calcium sulphate, magnesium sulphate and the sulphates of other metals present in minor quantities. These are recovered by evaporation and fractional crystallization to produce fertilizers in the case of ammonium sulphate and potassium sulphate.

The resin bed is regenerated with ½–1% solution of sodium hydroxide, and this regenerating solution, after use, will contain sodium glutamate in fairly large quantity, together with the sodium salts of various other organic acids, and will also contain sodium sulphate and sodium chloride. The sodium glutamate may be recovered by organic solvent action and used for chop suey and as a flavoring for soups. The other organic acids such as oxalic, citric, aconitic, etc., find uses in the various arts. Aconitic acid is used as a plasticizer for molded plastics.

I would state in conclusion that while the examples illustrated constitute a practical embodiment of my invention, I do not wish to limit myself precisely to these details, since manifestly the same may be considerably varied without departing from the spirit of the invention as defined in the appended claims.

What I claim is:

1. In the process of purifying a sugar juice wherein such juice is first defecated at an elevated temperature, then clarified and cooled, then passed through a plurality of parallel units, each unit comprising hydrogen exchange material and acid removal material, and wherein the final effluent from each unit is allowed to drop from an initial high pH to below a neutral pH before regeneration of the acid removal material, the improvement which comprises starting treatment in a unit at a time when treatment in another unit is at a progressed stage, and combining the low pH effluent of the progressed unit with the high pH initial effluent of the starting unit to obtain a blended juice of desired medium pH.

2. The method of refining a relatively impure sugar juice which comprises defecating the juice at an elevated temperature, then clarifying and cooling such defecated juice, subjecting a flow of such clarified and cooled juice to contact with a hydrogen exchange material and thereafter treating the juice by contact with an acid adsorption material, continuing said treatment until said materials are substantially exhausted, collecting in a blending zone effluent from said exchange and adsorption treatment taken at different conditions of exhaustion of said material, and blending the juices so taken.

3. The method of refining a relatively dilute and impure sugar juice which comprises defecating said juice to remove impurities, then dividing said defecated juice into at least two portions, passing one of said portions through a unit containing a hydrogen exchange material and an acid adsorption material which have reached a predetermined state of exhaustion, passing each of said other portions through similar units which have reached a progressively lesser state of exhaustion, stopping flow through said first unit when it has been substantially exhausted and simultaneously passing such portion into a regenerated unit, whereby the respective units are placed in operation in a predetermined staggered relationship, and equalizing the pH of such portions by collecting and blending a predetermined volume of said treated portions in a separate blending zone.

4. In the method of purifying sugar juices by defecating the juice at an elevated temperature, then clarifying and cooling the juice, thereafter contacting the clarified and cooled juice with a hydrogen exchange material and then with an acid adsorbent material and wherein the effluent from the acid adsorbent material is at first highly alkaline and becomes progressively less alkaline and finely acid, the improvement which comprises blending a highly alkaline portion of the effluent juice with an acid portion of the effluent juice whereby the pH of the respective portions of the treated juice will be equalized.

5. In the method of refining a sugar juice which comprises defecating the juice to remove impurities, subjecting the thus defecated juice to the sequential exchange action of a bed of hydrogen exchange material and a bed of acid adsorption material, said sequential exchange action being effected below the temperature at which substantial inversion occurs, the improvement comprising collecting treated juice from flow taken from said treatment at different conditions of exhaustion of said exchange material, and blending the same together to obtain a substantially neutral juice.

6. In the method of purifying a sugar solution which comprises defecating the solution to remove impurities, subjecting the thus clarified solution to the sequential exchange action of a bed of hydrogen exchange material and a bed of acid adsorption material, such sequential exchange action being effected below the temperature at which objectionable inversion occurs during the process, the improvement comprising passing a stream of defecated solution through a unit containing said exchange material until the capacity of said material has reached an intermediate stage of exhaustion, then passing another stream of such defecated solution through a second unit containing said material while simultaneously continuing the passage of said first stream through said first unit until said first unit is exhausted, whereby said units are sequentially placed in operation in a staggered relationship, then combining the effluents from said units, thereby providing an initial blending of said effluents, and collecting said initially blended effluents in a separate blending zone for a period sufficient to further blend and equalize the pH of said effluents.

7. In the method of purifying a sugar solution which comprises defecating the solution to remove impurities, subjecting the thus defecated solution to the sequential action of hydrogen exchange material and acid adsorption material, said sequential exchange action being effected below the temperature at which objectionable inversion occurs during the process, the improvement comprising passing defecated solution through a unit containing said exchange materials until the capacity of said materials becomes substantially exhausted and collecting the solution passed through said unit in a single blended zone, whereby the volume of solution treated by said unit is blended together and the pH of the entire volume of solution treated will be equalized.

HENRY A. VALLEZ.

Certificate of Correction

Patent No. 2,388,195. October 30, 1945.

HENRY A. VALLEZ

It is hereby certified that errors appear in the printed specification of the above numbered patent requiring correction as follows: Page 4, first column, line 60, claim 4, for "finely" read *finally*; and second column, line 55, claim 7, for "blended" read *blending*; and that the said Letters Patent should be read with these corrections therein that the same may conform to the record of the case in the Patent Office.

Signed and sealed this 14th day of May, A. D. 1946.

[SEAL]

LESLIE FRAZER,
*First Assistant Commissioner of Patents.*